(12) United States Patent
Wang

(10) Patent No.: US 10,477,925 B2
(45) Date of Patent: Nov. 19, 2019

(54) METHOD OF PREPARING SHOE COMPONENTS

(71) Applicant: CHAEI HSIN ENTERPRISE CO., LTD., Taichung (TW)

(72) Inventor: Shui-Mu Wang, Taichung (TW)

(73) Assignee: Chaei Hsin Enterprise Co., Ltd., Taichung (TW)

( * ) Notice: Subject to any disclaimer, the term of this patent is extended or adjusted under 35 U.S.C. 154(b) by 107 days.

(21) Appl. No.: 15/897,060

(22) Filed: Feb. 14, 2018

(65) Prior Publication Data

US 2019/0008237 A1  Jan. 10, 2019

(30) Foreign Application Priority Data

Jul. 6, 2017  (TW) .............................. 106122699 A

(51) Int. Cl.
| | | |
|---|---|---|
| A43D 25/00 | (2006.01) | |
| A43D 25/20 | (2006.01) | |
| A43B 9/12 | (2006.01) | |
| A43B 13/12 | (2006.01) | |
| A43D 25/07 | (2006.01) | |
| A43D 25/18 | (2006.01) | |
| B29D 35/00 | (2010.01) | |
| B29D 35/08 | (2010.01) | |
| B29D 35/14 | (2010.01) | |
| A43B 13/16 | (2006.01) | |
| A43D 3/02 | (2006.01) | |

(Continued)

(52) U.S. Cl.
CPC ................ *A43D 25/20* (2013.01); *A43B 9/12* (2013.01); *A43B 13/12* (2013.01); *A43B 13/16* (2013.01); *A43D 3/02* (2013.01); *A43D 25/00* (2013.01); *A43D 25/07* (2013.01); *A43D 25/18* (2013.01); *B29D 35/0063* (2013.01); *B29D 35/085* (2013.01); *B29D 35/148* (2013.01); *B32B 7/12* (2013.01); *B32B 7/14* (2013.01); *B32B 37/06* (2013.01); *B32B 37/1018* (2013.01); *B32B 37/1207* (2013.01); *B32B 37/1284* (2013.01); *B32B 37/1292* (2013.01); *B32B 37/18* (2013.01); *B32B 2037/1215* (2013.01); *B32B 2437/02* (2013.01)

(58) Field of Classification Search
CPC ...... A43D 25/20; A43D 25/06; A43D 25/063; B29D 35/085; B29D 35/0054; B29D 35/14; B29D 35/142; B29D 35/06; B29D 35/148; B32B 7/12; B32B 37/10
USPC .............................. 12/146 B, 142 RS, 142 T
See application file for complete search history.

(56) References Cited

U.S. PATENT DOCUMENTS 1,160,983 A * 11/1915 Hemenover ........... A43D 25/06
                                                                 12/33
3,314,173 A *  4/1967 Szerenyi .................. A43B 9/04
                                                                 36/83

(Continued)

*Primary Examiner* — Marie D Bays
(74) *Attorney, Agent, or Firm* — Lewis Roca Rothgerber Christie LLP

(57) ABSTRACT

A method of preparing shoe components includes the steps of: providing a first shoe component and a second shoe component, forming an adhesive member on one of the first and second shoe components, stacking the first and second shoe components such that the adhesive member is disposed therebetween, heating to melt the adhesive member so as to adhere the first and second shoe components to each other, and suctioning air to adhere the first and second shoe components closely to each other.

19 Claims, 14 Drawing Sheets

(51) Int. Cl.
*B32B 7/12* (2006.01)
*B32B 7/14* (2006.01)
*B32B 37/06* (2006.01)
*B32B 37/10* (2006.01)
*B32B 37/12* (2006.01)
*B32B 37/18* (2006.01)

(56) References Cited

U.S. PATENT DOCUMENTS

| | | | | |
|---|---|---|---|---|
| 4,662,018 | A * | 5/1987 | Autry | A43B 9/00 12/142 RS |
| 4,910,822 | A * | 3/1990 | Paolucci | A43D 25/00 12/142 RS |
| 9,420,852 | B2 * | 8/2016 | Chen | A43D 25/06 |
| 2007/0136960 | A1 * | 6/2007 | Doerer | A43B 13/02 12/146 B |
| 2016/0031164 | A1 * | 2/2016 | Downs | B29C 70/542 428/12 |
| 2016/0037864 | A1 * | 2/2016 | Chen | A43D 25/06 12/142 F |
| 2017/0150776 | A1 * | 6/2017 | Montoya | A43B 9/12 |
| 2018/0116333 | A1 * | 5/2018 | Chen | A43B 9/12 |

* cited by examiner

METHOD OF PREPARING SHOE COMPONENTS

CROSS-REFERENCE TO RELATED APPLICATION

This application claims priority to Taiwanese Invention Patent Application No. 106122699, filed on Jul. 6, 2017.

FIELD

The disclosure relates to a method of preparing shoe components which includes a heating step and an air suctioning step.

BACKGROUND

A method for manufacturing a shoe, as disclosed in Taiwanese Patent Publication No. 201526817, includes the steps of: placing an outsole into a mold cavity of a shoe mold disposed in an oven; sequentially laying a first adhesive film and a midsole over the outsole within the mold cavity; sending hot air into the oven to heat the first adhesive film through the midsole; extending a heating plate of a press machine into the mold cavity to press the midsole, so that heat can be conducted from the midsole to the first adhesive film to thermally activate the first adhesive film, thereby adhering the midsole and the outsole to each other; laying a second adhesive film over the midsole; sleeving an upper on a heating last of the press machine; sending hot air again into the oven to heat the second adhesive film; extending the heating last into the mold cavity to contact the upper with the second adhesive film so that heat from the heating last can be conducted to the second adhesive film through a bottom periphery of the upper so as to thermally activate the second adhesive film, thereby adhering the upper and the midsole to each other.

The aforesaid method uses the heating plate and the heating last to thermally activate the first and second adhesive films, respectively, and to press the midsole and the upper, respectively, so as to easily and quickly complete the bonding of the upper, the midsole and the outsole. However, bubbles easily exist in a junction between the midsole and the outsole or between the upper and the midsole, so that the bonding therebetween is poor. Further, to accelerate the melting of the first and second adhesive films, the bonding between the midsole and the outsole or between the upper and the midsole must be performed at a high temperature, such that when the midsole or the outsole is made of a foaming material, foaming is likely to occur twice, leading to deformation thereof. Thus, the shoe obtained from this method has a poor quality.

SUMMARY

Therefore, an object of the present disclosure is to provide a method of preparing shoe components that is capable of overcoming the aforesaid drawbacks of the prior art.

Accordingly, a method of preparing shoe components of this disclosure includes the steps of: providing a first shoe component and a second shoe component, forming an adhesive member on one of the first and second shoe components, stacking the first and second shoe components such that the adhesive member is disposed therebetween, heating to melt the adhesive member so as to adhere the first and second shoe components to each other, and suctioning air to adhere the first and second shoe components closely to each other.

BRIEF DESCRIPTION OF THE DRAWINGS

The features and advantages of the disclosure will become apparent in the following detailed description of the embodiments with reference to the accompanying drawings, of which.

DETAILED DESCRIPTION

Figure 1:
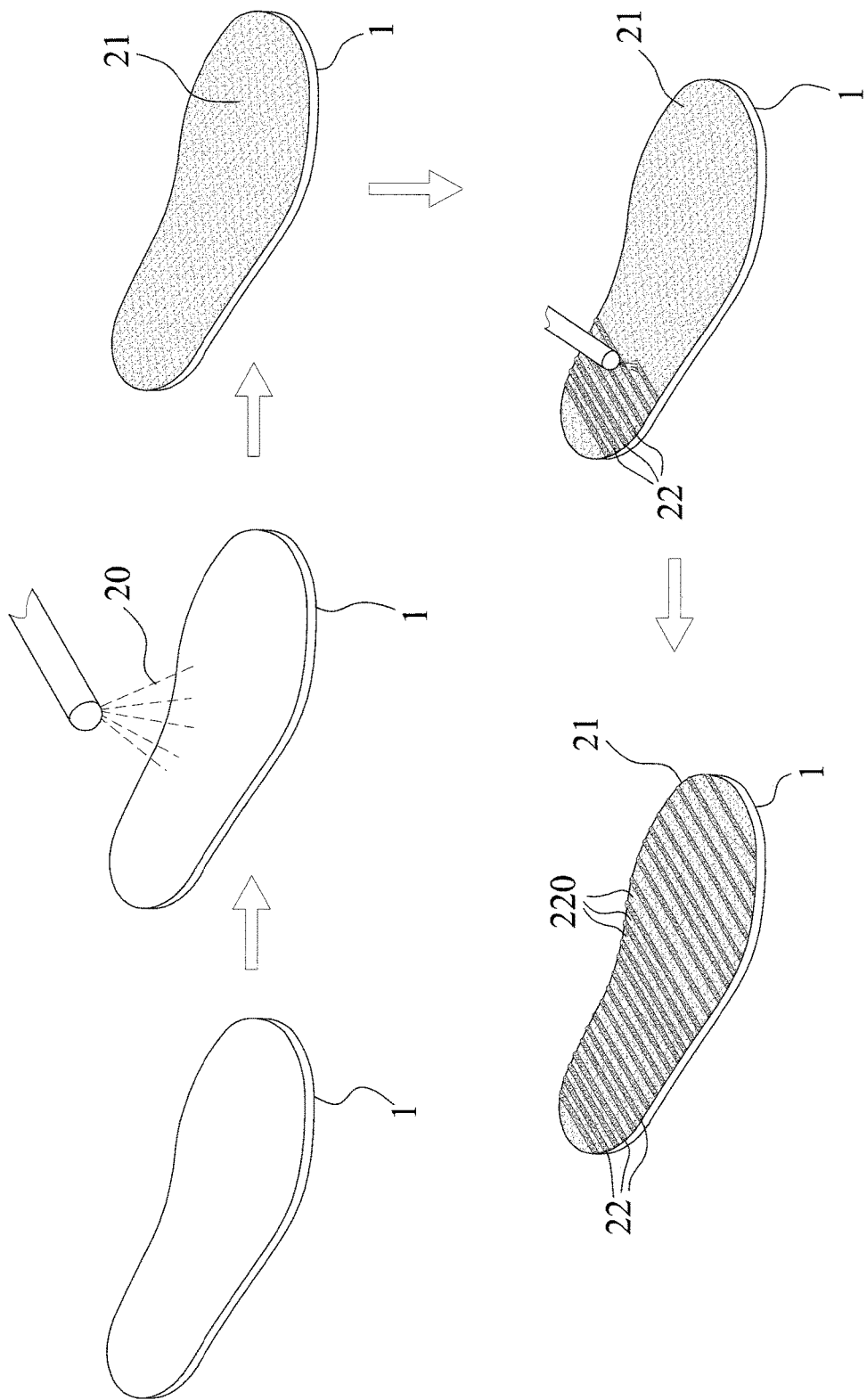
FIG. 1 is a flow diagram of a forming step of a method of preparing shoe components according to the first embodiment of this disclosure, illustrating how an adhesive member is formed on a midsole.

Before the present disclosure is described in greater detail with reference to the accompanying embodiments, it should be noted herein that like elements are denoted by the same reference numerals throughout the disclosure.

A method of preparing shoe components according to the first embodiment of the present disclosure includes a providing step, a forming step and a processing step. The processing step includes the steps of stacking, heating, suctioning and pressing.

Figure 8:
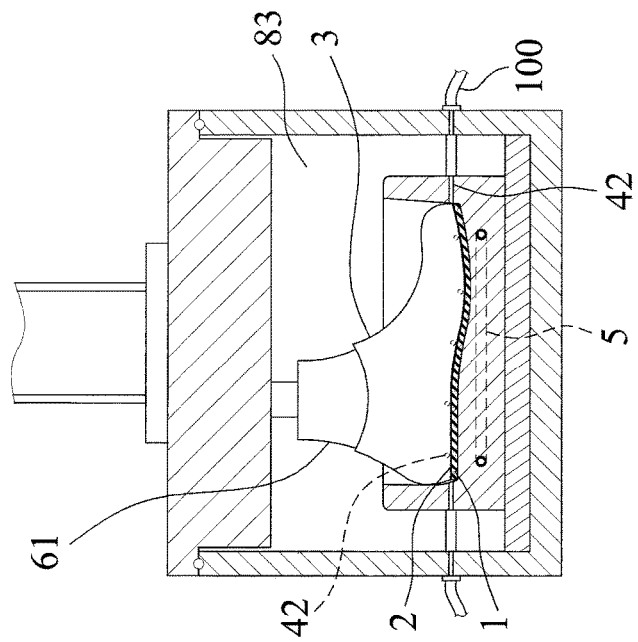
FIG. 8 is a flow diagram of a processing step of the method of the first embodiment.
Figure 8:
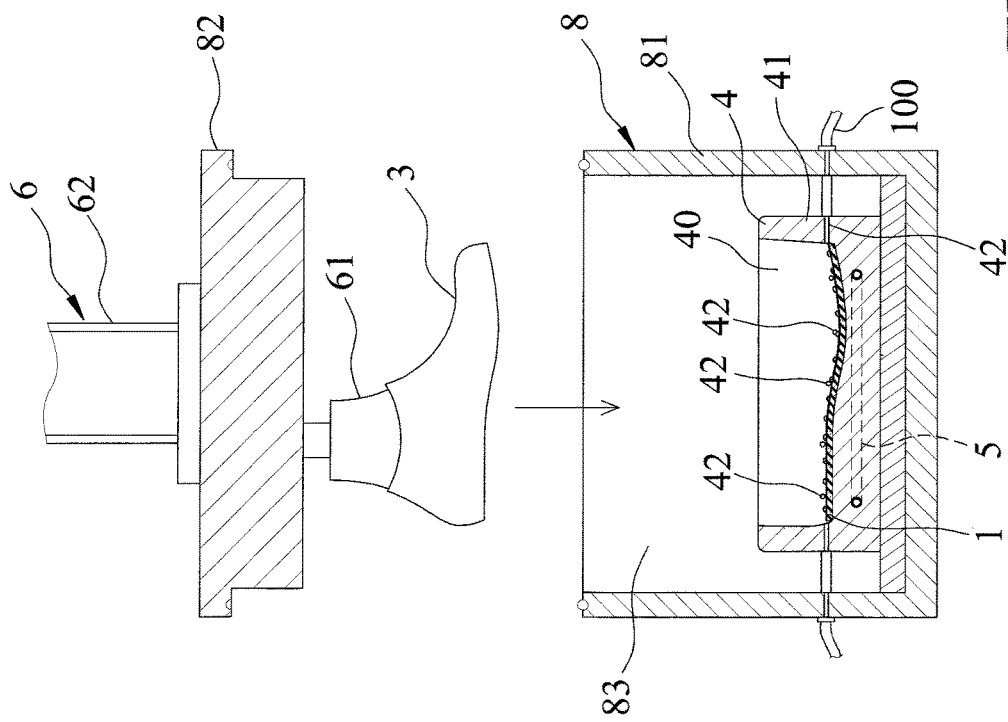

In the providing step, a first shoe component and a second shoe component are provided. In this embodiment, as shown in FIGS. 1 and 8, the first shoe component is exemplified as an upper 3, and the second shoe component is exemplified as a midsole 1.

Figure 7:
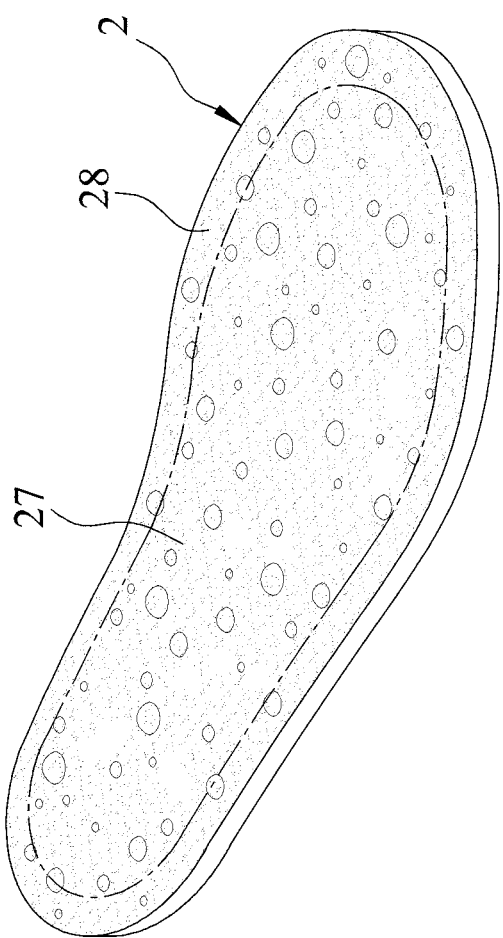
FIG. 7 is a perspective view of the adhesive member of the first embodiment.

In the forming step, an adhesive member 2 is formed on one of the upper 3 and the midsole 1. In this embodiment, the adhesive member 2 (see FIGS. 1 and 7) is formed on a top surface of the midsole 1. The forming of the adhesive member 2 is described below and is not limited to the below disclosures.

Referring to FIG. 1, one method of forming the adhesive member 2 on the top surface of the midsole 1 includes the steps of spraying an adhesive 20 on the top surface of the midsole 1 to form an adhesive layer 21 that extends along the length of the midsole 1, and disposing a plurality of spaced-apart adhesive strips 22 on a surface of the adhesive layer 21 opposite to the midsole 1 so as to form a plurality of alternating grooves and protrusions thereon. In this case, the adhesive member 2 includes the adhesive layer 21 and the adhesive strips 22. The alternating grooves and protrusions are arranged transversely along the length of the adhesive layer 21. Each groove constitutes an air flow channel 220 that extends to a peripheral edge of the adhesive layer 21 in proximity to the midsole 1. It is worth to mention herein that there is no particular restriction on the shape, arrangement or number of the adhesive strips 22 as long as the air flow channel 220 can extend proximate to the peripheral edge of the midsole 1 for permitting air in the air flow channels 220 to discharge therefrom during the suctioning step.

Figure 2:
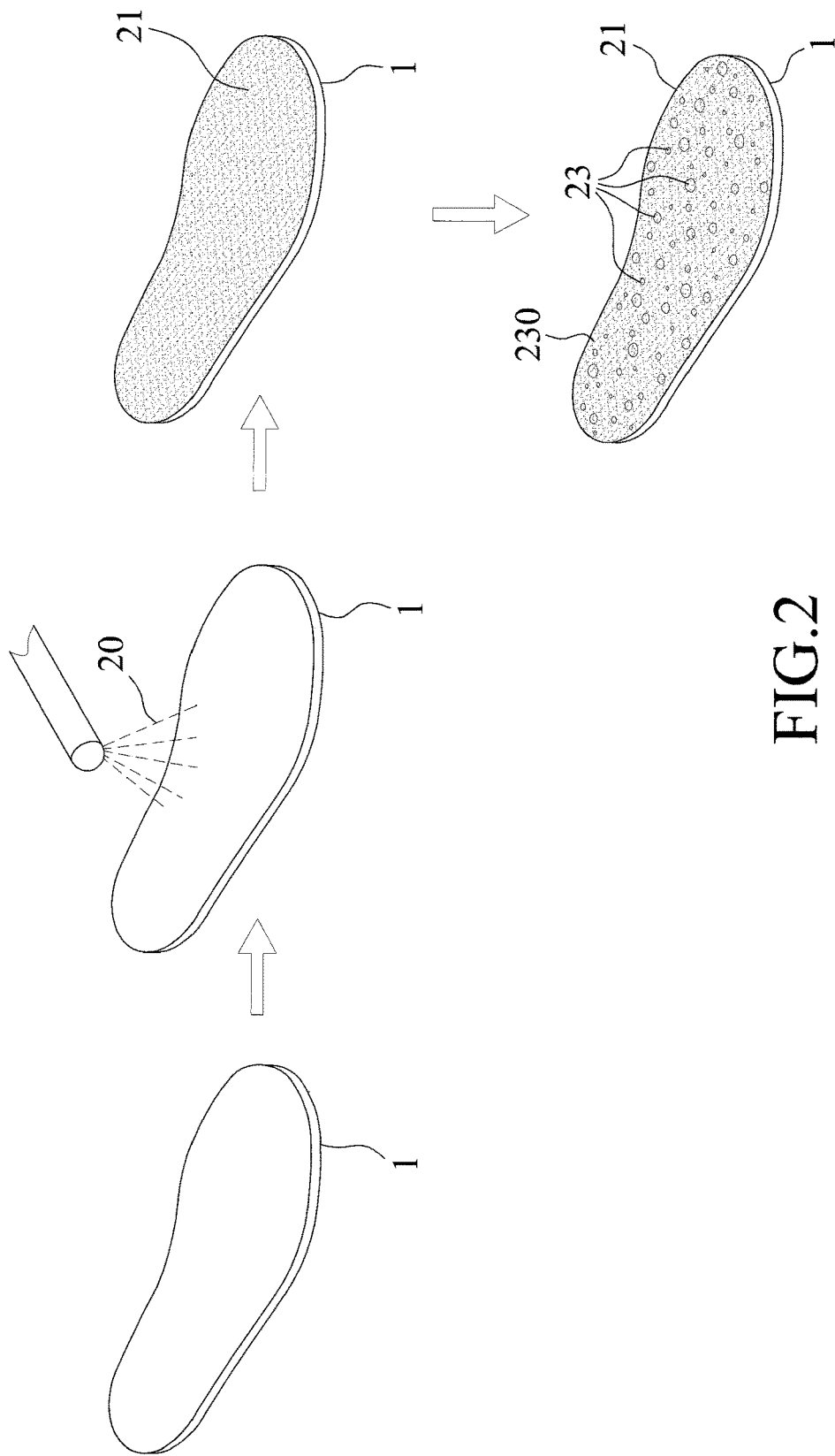
FIG. 2 is a flow diagram of the forming step of the method of the first embodiment, illustrating another way of forming the adhesive member on the midsole.
Figure 3:
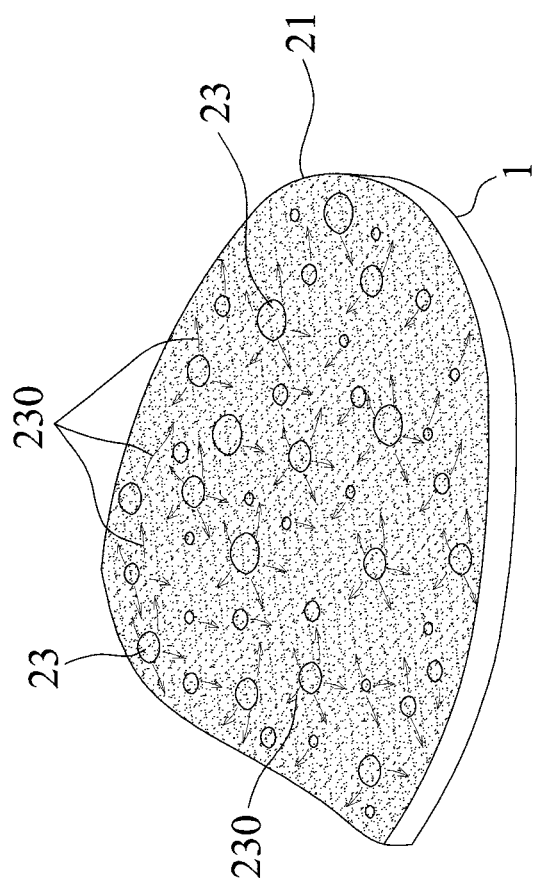
FIG. 3 is an enlarged view of the encircled portion of FIG. 2.

Referring to FIGS. 2 and 3, another method of forming the adhesive member 2 on the top surface of the midsole 1 includes the steps of spraying an adhesive 20 on the top surface of the midsole 1 to form an adhesive layer 21, and disposing a plurality of spaced-apart adhesive particles 23 on a surface of the adhesive layer 21 opposite to the midsole 1. In this case, the adhesive member 2 includes the adhesive layer 21 and the adhesive particles 23. The adhesive particles 23 protrude from the surface of the adhesive layer 21 opposite to the midsole 1, and cooperatively define a plurality of air flow channels 230 that extend to a peripheral edge of the adhesive layer 21 in proximity to the midsole 1. There is no particular restriction on the shape, arrangement or number of the adhesive particles 23 as long as the air flow channels 230 can extend proximate to the peripheral edge of the midsole 1 for permitting air in the air flow channels 230 to discharge therefrom during the suctioning step.

Figure 4:
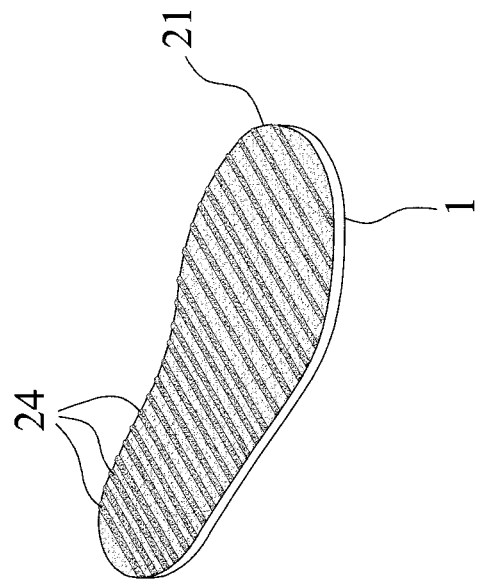
FIG. 4 is a flow diagram of the forming step of the method of the first embodiment, illustrating a third way of forming the adhesive member on the midsole.
Figure 4:
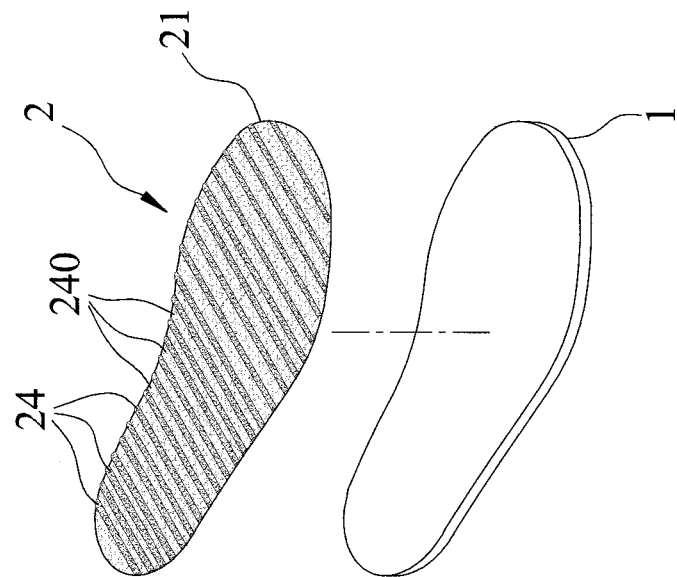

Referring to FIG. 4, a third method of forming the adhesive member 2 on the top surface of the midsole 1 includes the steps of providing an adhesive layer 21 and a plurality of adhesive blocks 24 disposed on a surface of the adhesive layer 21 to form the adhesive member 2, and adhering the adhesive member 2 to the top surface of the midsole 1 with the adhesive blocks 24 opposite to the midsole 1. In this embodiment, the adhesive blocks 24 are adhesive strips, and an air flow channel 240 is formed between each two adjacent ones of the adhesive strips. The air flow channel 240 extends to a peripheral edge of the adhesive layer 21 in proximity to the midsole 1. It is worth to mention herein that the adhesive blocks 24 may also be adhesive particles (not shown).

Figure 5:
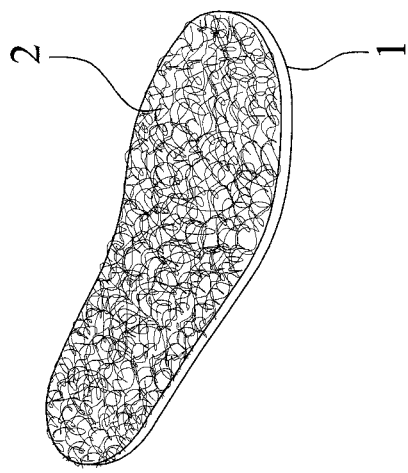
FIG. 5 is a flow diagram of the forming step of the method of the first embodiment, illustrating a fourth way of forming the adhesive member on the midsole.
Figure 5:
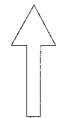
Figure 5:
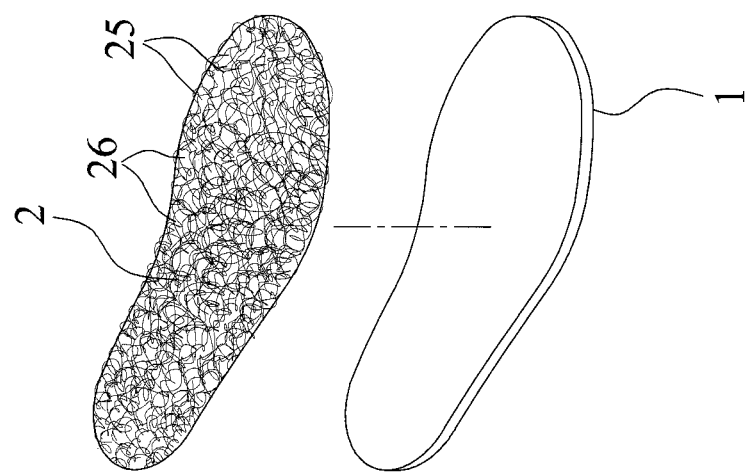

Referring to FIG. 5, a fourth method of forming the adhesive member 2 on the top surface of the midsole 1 includes the steps of providing a plurality of entangled adhesive filaments 25 to form the adhesive member 2, and adhering the adhesive member 2 to the top surface of the midsole 1. The adhesive filaments 25 cooperatively define a plurality of air holes 26.

Figure 6:
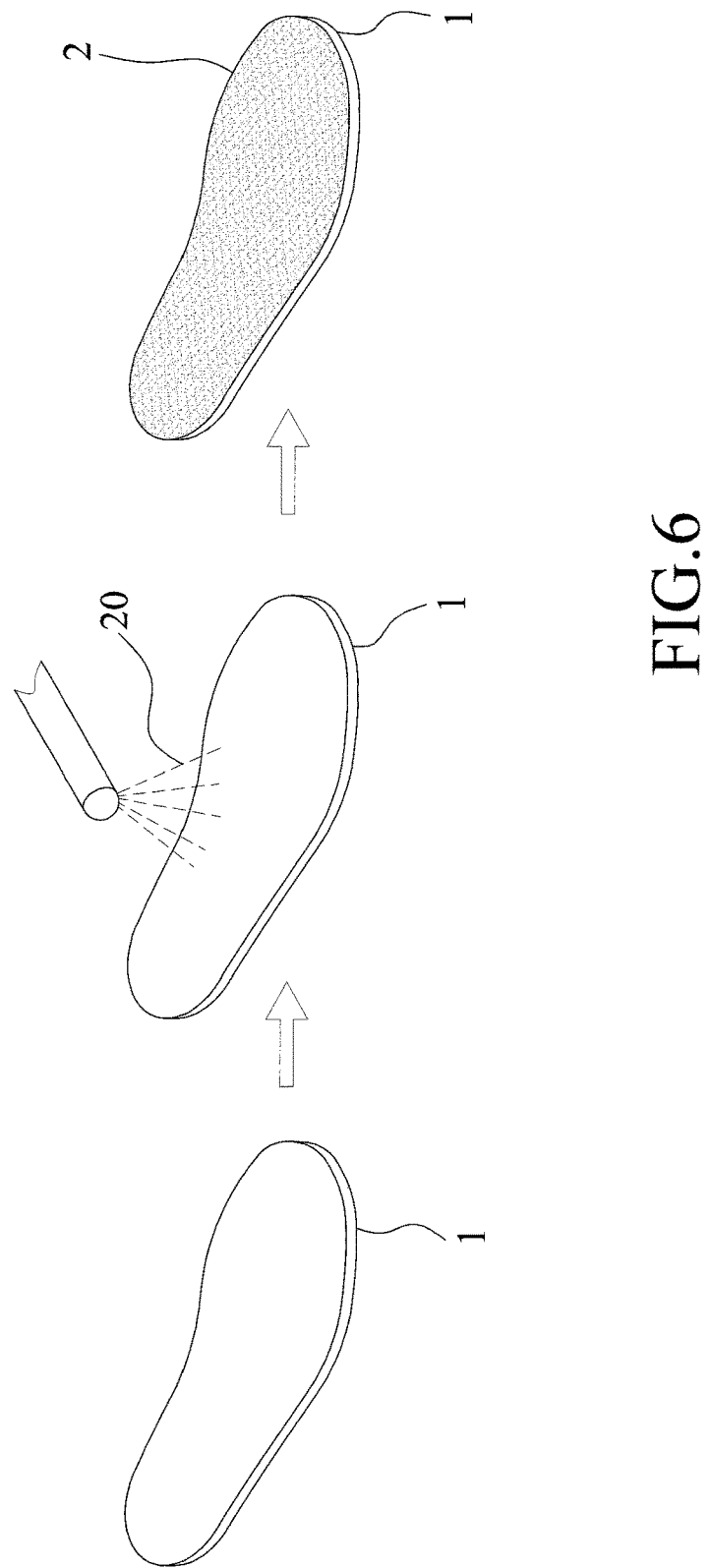
FIG. 6 is a flow diagram of the forming step of the method of the first embodiment, illustrating a fifth way of forming the adhesive member on the midsole.

Referring to FIG. 6, a fifth method of forming the adhesive member 2 on the top surface of the midsole 1 includes the step of spraying an adhesive 20 on the top surface of the midsole 1 to form the adhesive member 2. In this case, each surface of the adhesive member 2 has a substantially planar surface. In order to promote the efficiency of the adhesive member 2 during the heating step, preferably, the adhesive member 2 includes a central adhesive portion 27 and a surrounding adhesive portion 28 surrounding the central adhesive portion 27, and the central adhesive portion 27 has a melting point lower than that of the surrounding adhesive portion 28. Taking the third method as an example and referring to FIG. 7, during the heating step, when heat is transmitted to the central adhesive portion 27 and the surrounding adhesive portion 28, because the melting point of the central adhesive portion 27 is lower than that of the surrounding adhesive portion 28, as the surrounding adhesive portion 28 melts, the central adhesive portion 27 also melts simultaneously.

Referring to FIG. 8, in the stacking step, the upper 3 and the midsole 1 are stacked in a mold cavity 40 defined by a mold 4. The mold 4 is disposed in an operating space 83 defined by a container 81 of a forming device 8. The upper 3 is disposed above the midsole 1, and the adhesive member 2 is located between a bottom surface of the upper 3 and the top surface of the midsole 1 with two opposite surfaces respectively facing the upper 3 and the midsole 1. The mold 4 includes a surrounding wall 41 defining the mold cavity 40 and having at least one through hole 42 communicating with the mold cavity 40. A junction between the bottom surface of the upper 3 and the top surface of the midsole 1 is located roughly corresponding to the at least one through hole 42, and the air flow channels 220 of the adhesive member 2 communicate with the mold cavity 40. In this embodiment, the surrounding wall 41 has a plurality of the through holes 42.

In the heating step, the mold 4 is heated to melt the adhesive member 2 so as to adhere the upper 3 and the midsole 1 to each other. The heat source is a heater 5 embedded in the mold 4. Heat generated by the heater 5 may be one of hot air, radiation heat, electric heat, microwave heat, low frequency heat or medium frequency heat. There is no particular restriction on the disposition of the heater 5, and the disposition of the heater 5 may be adjusted according to the type thereof.

In the suctioning step, a cover 82 of the forming device 8 is covered on the container 81 to close and confine the mold 4 in the operating space 83. A suction device includes a plurality of suction tubes 100 connected to the through holes 42 in the surrounding wall 41 of the mold 4 so as to suck air out of the mold cavity 40, so that the mold cavity 40 is disposed in a negative pressure state lower than the atmospheric pressure or a vacuum state. In this state, the bottom surface of the upper 3 and the top surface of the midsole 1 are moved close to each other, and air therebetween is removed through the air flow channels 220 or the air holes 26 in the adhesive member 2. Since no air exists in the junction between the bottom surface of the upper 3 and the top surface of the midsole 1, the upper 3 and the midsole 1 can be closely adhered to each other. It is worth to mention herein that the heating step and the suctioning step may be performed one after the other or simultaneously.

In the pressing step, a pressing unit 6 is used to press the upper 3 against the midsole 1 so as to tightly adhere the bottom surface of the upper 3 and the top surface of the midsole 1 to each other. The pressing unit 6 includes a last 61 connected to a bottom side of the cover 82 for the upper 3 to sleeve thereon and for pressing the same against the midsole 1, and a drive device 62 connected to a top side of the cover 82 for driving the last 61 to press the upper 3. The drive device 62 may be a hydraulic or pneumatic cylinder, but is not limited thereto. It is worth to mention herein that the heating step, the suctioning step and the pressing step may be performed simultaneously.

Figure 9:
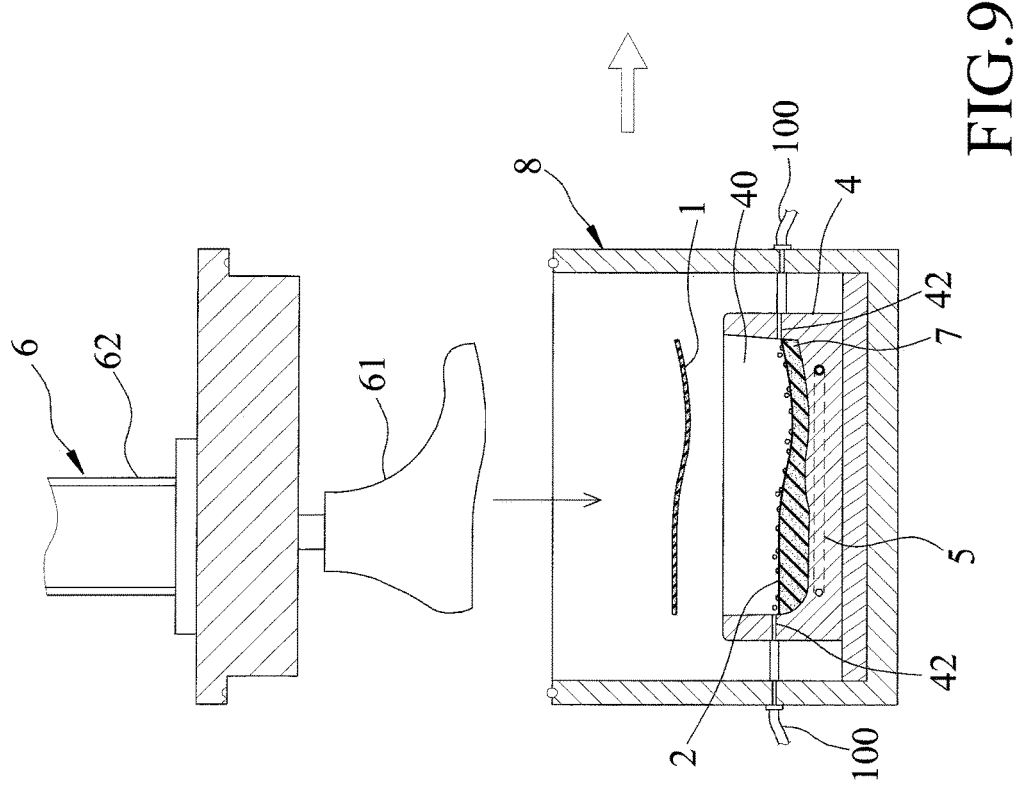
FIG. 9 is a flow diagram of a processing step of a method of preparing shoe components according to the second embodiment of this disclosure.

Referring to FIG. 9, the second embodiment of the method of preparing shoe components of this disclosure is shown to be identical to the first embodiment. However, in this embodiment, the first shoe component is exemplified as a midsole 1, and the second shoe component is exemplified as an outsole 7. In the forming step, the adhesive member 2 is formed on a top surface of the outsole 7. In the stacking step, the midsole 1 and the outsole 7 are stacked in the mold cavity 40 of the mold 4, and the adhesive member 2 is located between a bottom surface of the midsole 1 and the top surface of the outsole 7. In the heating step, the mold 4 is heated to melt the adhesive member 2 so that the midsole 1 and the outsole 7 can be adhered to each other. In the suctioning step, air is sucked out of the mold cavity 40 by the suction tubes 100 through the through holes 42 so as to adhere the bottom surface of the midsole 1 closely to the top surface of the outsole 7. In the pressing step, the last 61 of the pressing unit 6 is used to press the midsole 1 to tightly adhere against the outsole 7.

Figure 10:
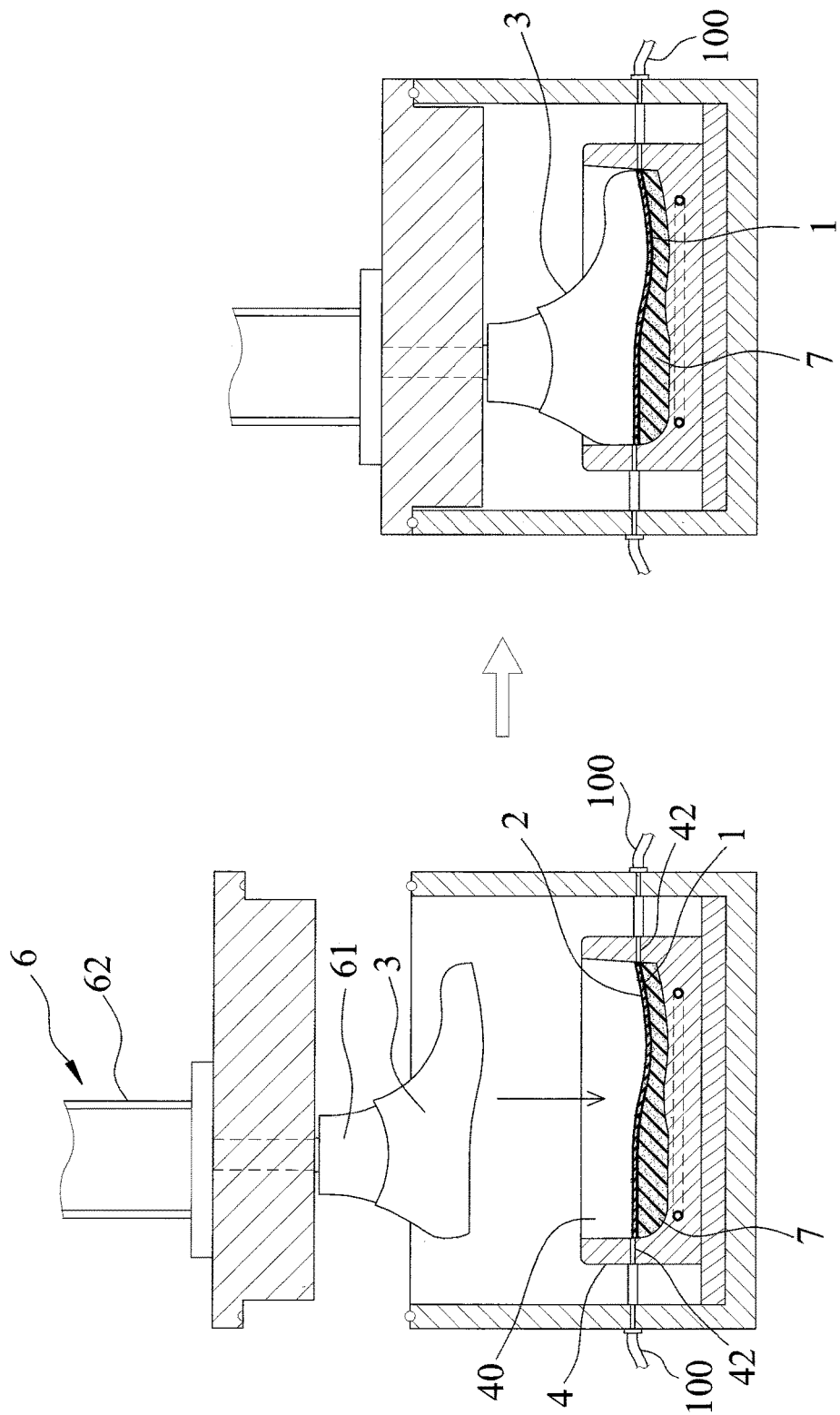
FIG. 10 is a flow diagram of a processing step of a method of preparing shoe components according to the third embodiment of this disclosure.

Referring to FIG. 10, the third embodiment of the method of preparing shoe components of this disclosure is shown to be identical to the first embodiment. However, in this embodiment, the second shoe component is exemplified as including an assembly of a midsole 1 and an outsole 7. In the forming step, the adhesive member 2 is formed on a top surface of the midsole 1. In the stacking step, the upper 3 and the assembly of the midsole 1 and the outsole 7 are stacked in the mold cavity 40 of the mold 4 with the upper 3 being disposed above the midsole 1, and the adhesive member 2 is located between the bottom surface of the upper 3 and the top surface of the midsole 1. In the suctioning step, air is sucked out of the mold cavity 40 by the suction tubes 100 through the through holes 42 so as to adhere the bottom surface of the upper 3 closely to the top surface of the midsole 1. In the pressing step, the upper 3 is sleeved on the last 61 of the pressing unit 6, and the last 61 is driven by the drive device 62 to press the upper 3 against the top surface of the midsole 1 so as to tightly adhere the upper 3 against the assembly of the midsole 1 and the outsole 7.

Figure 11:
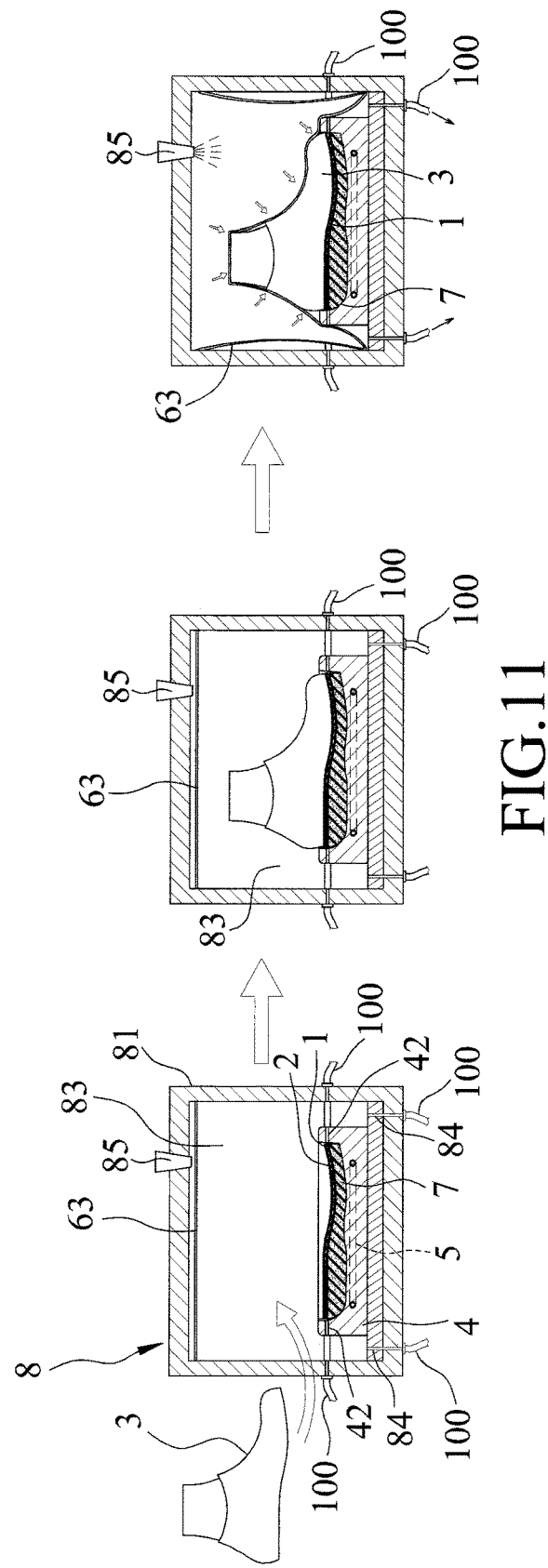
FIG. 11 is a flow diagram of a processing step of a method of preparing shoe components according to the fourth embodiment of this disclosure.

Referring to FIG. 11, the fourth embodiment of the method of preparing shoe components of this disclosure is shown to be identical to the third embodiment. However, in this embodiment, a plurality of suction holes 84 are formed in the container 81 communicating with the operating space 83 and for connection with the suction tubes 100, and a heating hole 85 is formed in an upper portion of the container 81 and communicates with the operating space 83 for connection with a heating device (not shown) for allowing heat from the heating device to enter the operating space 83 for heating the same. The upper 3 is disposed in the operating space 83 through aside portion of the container 81, as shown by an arrow in FIG. 11. The pressing unit 6 includes a pressing member 63 fixed to the container 81 and located within the operating space 83 in proximity to a top end thereof. In the suctioning step, air is sucked out of the operating space 83 by the suction tubes 100 through the suction holes 84 and air is sucked out of the mold cavity 40 by the suction tubes 100 through the through holes 42, so that the operating space 83 and the mold cavity 40 are disposed in a negative pressure state or vacuum state. At this state, the pressing member 63 is pulled by a suction force to move toward the upper 3 so as to cover and press the upper 3 tightly against the assembly of the midsole 1 and the outsole 7.

The pressing member 63 of this embodiment is a flexible air-impermeable membrane, but is not limited thereto. The flexible air-impermeable membrane is formed from a component which includes a reagent selected from, but is not limited to, plastic, rubber, silicone or a combination thereof. In order for the flexible air-impermeable membrane to have better mechanical properties, such as high ductility without breaking, the component of the flexible air-impermeable membrane may further include a plurality of fibers for reinforcing the reagent. The fibers may be woven, knitted or powdered fibers, but is not limited thereto.

Figure 12:
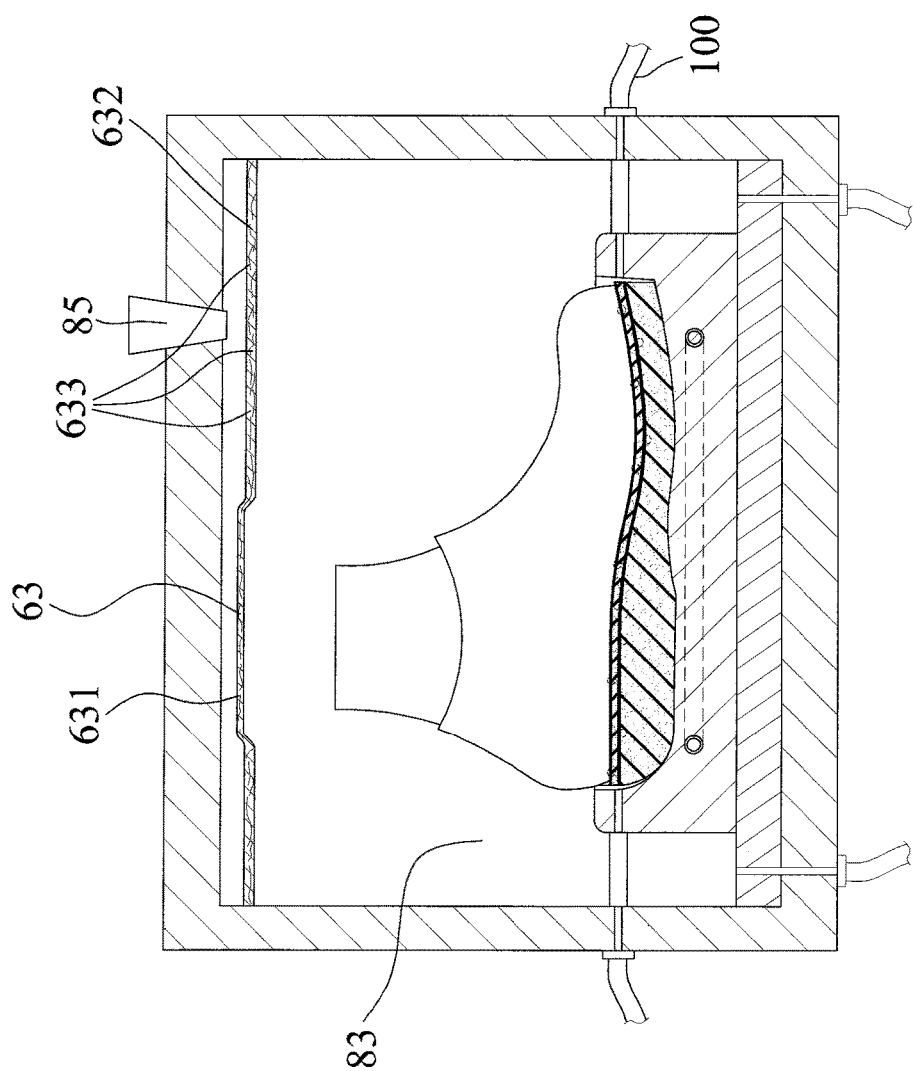
FIG. 12 illustrates an alternative form of a press member of a pressing unit of the fourth embodiment.

The pressing member 63 may have a central portion for pressing the upper 3 in the pressing step, and a surrounding portion surrounding the central portion and thicker than the central portion. For example, referring to FIG. 12, the pressing member 63 is a flexible air-impermeable membrane having a plurality of fibers 633, a central portion 631, and a surrounding portion 632 surrounding the central portion 631 and thicker than the central portion 631. When air is sucked from the operating space 83, the central portion 631 is more susceptible to deform than the surrounding portion 632 and is quicker to abut against the upper 3 so as to cover and press the same. Further, because the central portion 631 is thinner than the surrounding portion 632, heat from the heating hole 85 is quickly transmitted from the central portion 631 to the upper 3, so that the upper 3 can be quickly heated to transmit the heat to the adhesive member 2, thereby assisting the heater 5 to shorten the heating time of the adhesive member 2. Hence, the upper 3 can be quickly adhered to the assembly of the midsole 1 and the outsole 7.

Figure 13:
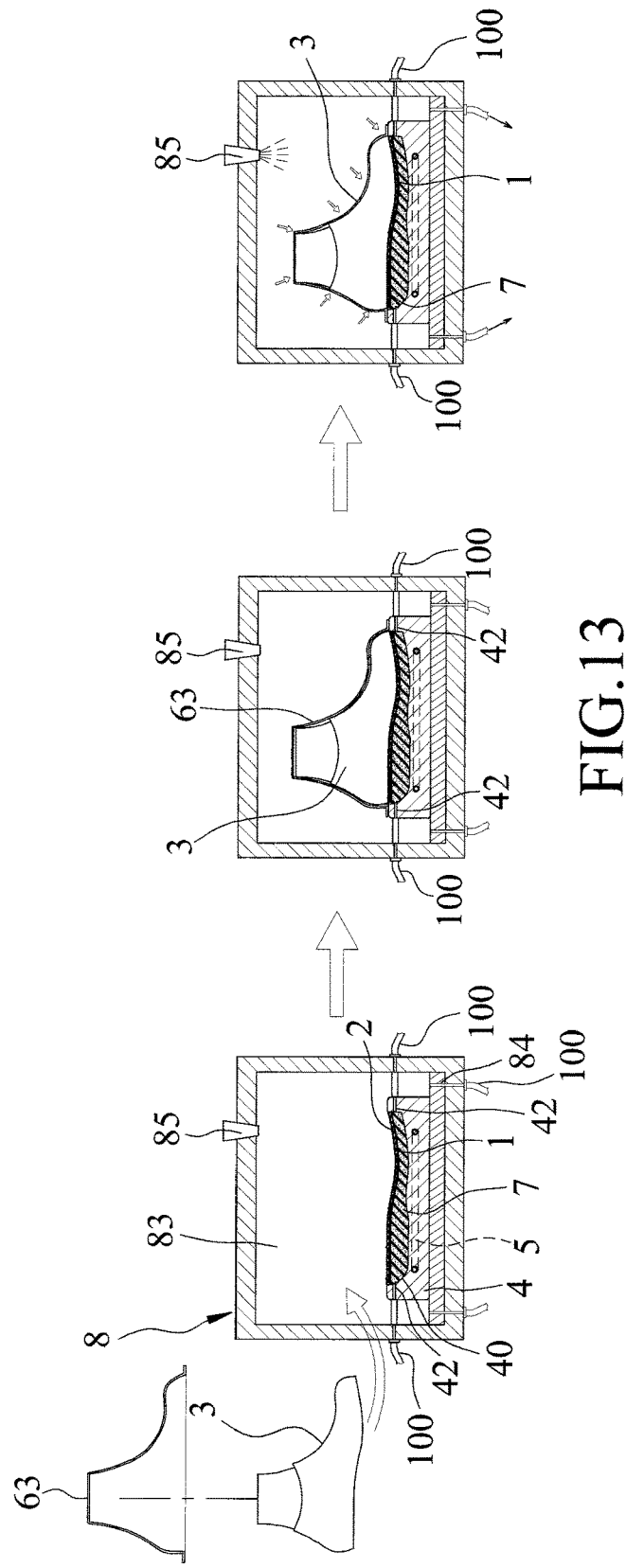
FIG. 13 is a flow diagram of a processing step of a method of preparing shoe components according to the fifth embodiment of this disclosure.

Referring to FIG. 13, the fifth embodiment of the method of preparing shoe components of this disclosure is shown to be identical to the fourth embodiment. However, in this embodiment, the pressing member 63 is a mold that is made of a flexible air-impermeable material, that has the shape of the upper, and that is sleeved on the upper 3 to cover the same. In the suctioning step, through the connection of the suction tubes 100 and the through holes 42, air is sucked out of the mold cavity 40 so as to place the mold cavity 40 in a negative pressure state or vacuum state. At this state, the pressure between the pressing member 63 and the upper 3 will reduce and a suction force is generated to pull the pressing member 63 against the upper 3 so as to press the upper 3 tightly against the assembly of the midsole 1 and the outsole 7.

Figure 14:
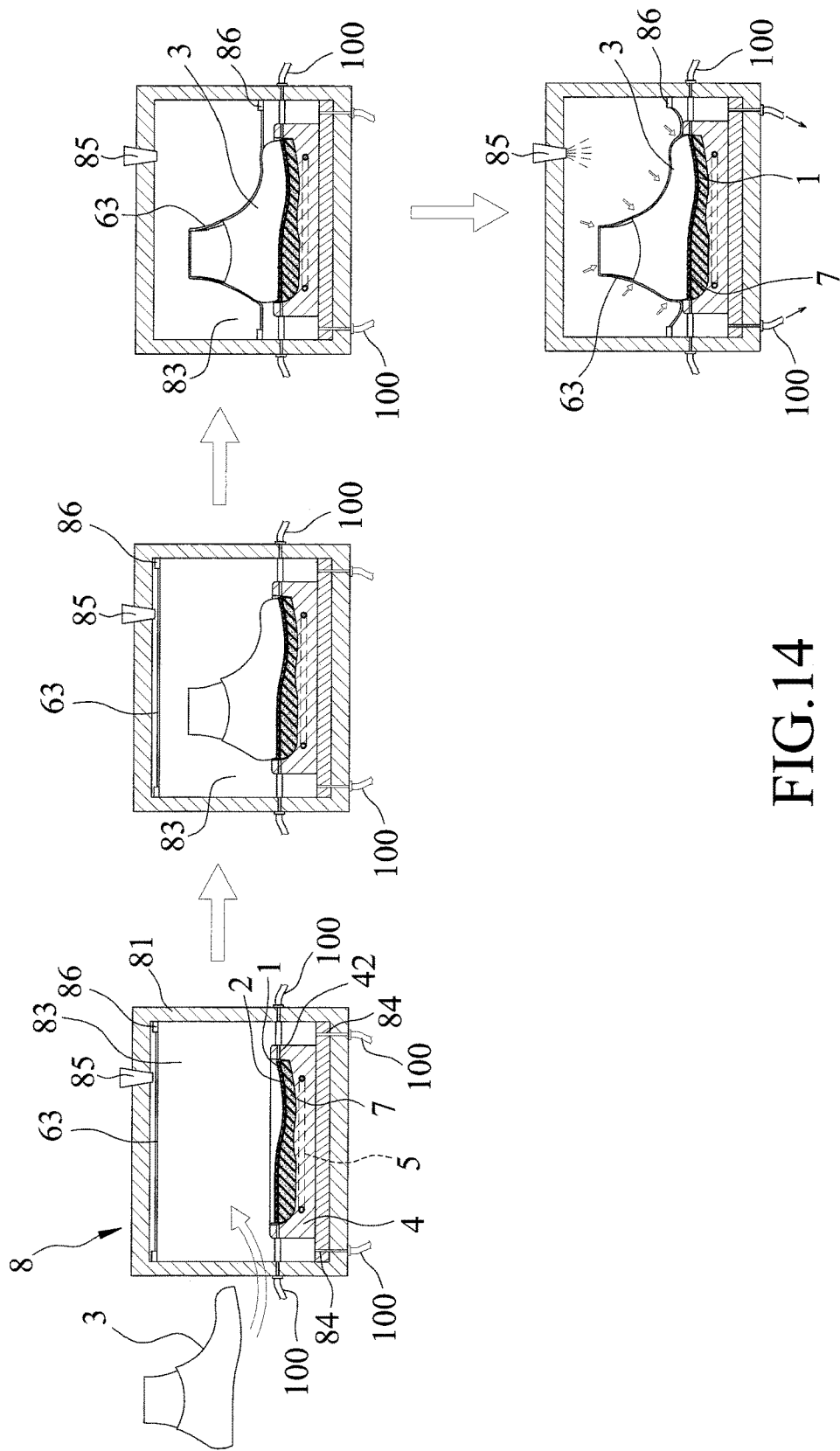
FIG. 14 is a flow diagram of a processing step of a method of preparing shoe components according to the sixth embodiment of this disclosure.

Referring to FIG. 14, the sixth embodiment of the method of preparing shoe components of this disclosure is shown to be identical to the fifth embodiment. However, in this embodiment, the pressing member 63 is fixed to a frame 86 that is disposed in the operating space 83 and that is movable toward and away from the mold 4 relative to the container 81. The pressing member 63 covers the upper 3 when the frame 86 is operated to move toward the mold 4, and is pulled by a suction force to press the upper 3 tightly against the assembly of the midsole 1 and the outsole 7 in the suctioning step.

In an alternative embodiment, the frame 86 and the mold 4 may both be operated to move toward and away from each other.

In sum, through the suctioning step of the method of preparing shoe components of this disclosure, air between the adhesive member 2 and the first or second shoe component can be sucked out to prevent existence of bubbles that can cause poor bonding therebetween. Simultaneously, in the suctioning step, the pressure in the mold cavity 40 can be reduced to result in the decrease of the melting point of the adhesive member 2, so that the temperature of the heating step must also be lowered. As such, the first and second shoe components will not deform, thereby enhancing the quality of the shoe components. Further, through the pressing step, the first and second shoe components can be tightly bonded to each other. Hence, the object of this disclosure can indeed be achieved.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method of preparing shoe components comprising:
   providing a first shoe component and a second shoe component;
   forming an adhesive member on one of the first and second shoe components;
   stacking the first and second shoe components such that the adhesive member is disposed therebetween;
   heating to melt the adhesive member so as to adhere the first and second shoe components to each other; and
   suctioning air to adhere the first and second shoe components closely to each other.

2. The method as claimed in claim 1, wherein the first and second shoe components are stacked in a mold cavity defined by a mold, and air is sucked out of the mold cavity in the suctioning step.

3. The method as claimed in claim 2, wherein the adhesive member has two opposite surfaces respectively facing the first and second shoe components, and at least one of the surfaces of the adhesive member is formed with a plurality of alternating grooves and protrusions.

4. The method as claimed in claim 3, wherein the alternating grooves and protrusions extend to a peripheral edge of the at least one of the surfaces of the adhesive member.

5. The method as claimed in claim 1, wherein the adhesive member includes a central adhesive portion and a surrounding adhesive portion surrounding the central adhesive portion, and the central adhesive portion has a melting point lower than that of the surrounding adhesive portion.

6. The method as claimed in claim 1, further comprising a step of pressing the stacked first and second shoe components using a pressing unit so as to press the first and second shoe components tightly to each other.

7. The method as claimed in claim 6, wherein the pressing unit includes a last, and a drive device for driving the last.

8. The method as claimed in claim 6, wherein the pressing unit includes a pressing member.

9. The method as claimed in claim 7, wherein the first shoe component is a midsole, and the second shoe component is an outsole, the adhesive member being formed on one of the midsole and the outsole, the midsole being pressed by the last to tightly adhere against the outsole in the pressing step.

10. The method as claimed in claim 7, wherein the first shoe component is an upper, and the second shoe component is a midsole, the upper being sleeved on the last and being pressed by the last to tightly adhere against the midsole in the pressing step.

11. The method as claimed in claim 7, wherein the first shoe component is an upper, and the second shoe component is an assembly of a midsole and an outsole, the adhesive member being formed on one of the midsole and the upper, the upper being sleeved on the last and being pressed by the last to tightly adhere against the assembly of the midsole and the outsole in the pressing step.

12. The method as claimed in claim 8, wherein the first shoe component is an upper, and the second shoe component is an assembly of a midsole and an outsole.

13. The method as claimed in claim 12, wherein the pressing member is a mold that is made of a flexible air-impermeable material, that has the shape of the upper and that is sleeved on the upper to cover the same, the pressing member being pulled by a suction force to press the upper against the assembly of the midsole and the outsole in the suctioning step.

14. The method as claimed in claim 12, wherein the upper and the assembly of the midsole and the outsole are stacked in a mold cavity defined by a mold, the mold being disposed in an operating space defined by a container of a forming device, the container having at least one suction hole communicating with the operating space, the pressing member being a flexible air-impermeable membrane.

15. The method as claimed in claim 14, wherein the flexible air-impermeable membrane is formed from a component which includes a reagent selected from one plastic, rubber, silicone or a combination thereof.

16. The method as claimed in claim 15, wherein the component further includes a plurality of fibers.

17. The method as claimed in claim 12, further comprising a step of forming the assembly of the midsole and the outsole prior to the providing step, the step of forming the assembly of the midsole and the outsole including the steps of providing the midsole and the outsole, forming an adhesive member on one of the midsole and the outsole, stacking the midsole and the outsole such that the adhesive member is disposed therebetween, heating to melt the adhesive member so as to adhere the midsole and the outsole to each other, and suctioning air to adhere the midsole and the outsole closely to each other.

18. The method as claimed in claim 14, wherein the pressing member is fixed to the container 81 within the operating space 83 and is pulled by a suction force to move toward the upper so as to cover and press the upper tightly against the assembly of the midsole and the outsole in the suctioning step.

19. The method as claimed in claim 14, wherein the pressing member is fixed to a frame that is disposed in the operating space and that is movable toward and away from the mold relative to the container, and wherein, the pressing member covers the upper when the frame is operated to move toward the mold, and is pulled by a suction force to press the upper tightly against the assembly of the midsole and the outsole in the suctioning step.

* * * * *